US008553023B2

(12) United States Patent
Yoshizaki et al.

(10) Patent No.: US 8,553,023 B2
(45) Date of Patent: Oct. 8, 2013

(54) ELECTRO-OPTICAL DEVICE AND ELECTRONIC APPARATUS

(75) Inventors: Kei Yoshizaki, Shiojiri (JP); Hitoshi Ota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 674 days.

(21) Appl. No.: 12/774,963

(22) Filed: May 6, 2010

(65) Prior Publication Data

US 2010/0289788 A1 Nov. 18, 2010

(30) Foreign Application Priority Data

May 15, 2009 (JP) ................................ 2009-118351

(51) Int. Cl.
*G06F 3/038* (2013.01)

(52) U.S. Cl.
USPC ................................ 345/211; 345/76; 345/78

(58) Field of Classification Search
USPC ...................................................... 345/76, 78
See application file for complete search history.

(56) References Cited

U.S. PATENT DOCUMENTS

| | | | | |
|---|---|---|---|---|
| 7,119,767 | B1 * | 10/2006 | Komiya et al. | 345/76 |
| 7,598,935 | B2 * | 10/2009 | Kim | 345/78 |
| 2007/0063933 | A1 * | 3/2007 | Chung | 345/76 |

FOREIGN PATENT DOCUMENTS

| | | | |
|---|---|---|---|
| JP | A-2006-337714 | | 12/2006 |
| JP | 2007133283 | A * | 5/2007 |
| JP | A-2007-133283 | | 5/2007 |
| JP | A-2008-241948 | | 10/2008 |
| JP | A-2010-266498 | | 11/2010 |

* cited by examiner

*Primary Examiner* — Quan-Zhen Wang
*Assistant Examiner* — Troy Dalrymple
(74) *Attorney, Agent, or Firm* — Oliff & Berridge, PLC

(57) ABSTRACT

An electro-optical device is provided that includes a plurality of unit circuits and a scanning line drive circuit. Each of the plurality of unit circuits includes a light emitting element, a drive transistor, a light emitting control transistor, and a switching element. Each of the plurality of scanning lines includes a light emitting control line. The scanning line drive circuit includes a first light emitting control line drive circuit connected to one end of the light emitting control line; and a second light emitting control line drive circuit connected to the other end of the light emitting control line. The first and second light emitting control line drive circuits supply the light emitting control signal to the light emitting control line from both ends thereof at a predetermined timing.

12 Claims, 11 Drawing Sheets

| | | | | | | | |
|---|---|---|---|---|---|---|---|
| Tel[GEL] | OFF | ON | | OFF | ON | OFF | ON |
| Tr1[GWRT] | OFF | OFF | | ON | ON | ON | OFF |
| Tr2[GINI1] | ON | ON | | OFF | OFF | OFF | OFF |
| Tr3[GINI2] | ON | OFF | | OFF | OFF | OFF | OFF |

ELECTRO-OPTICAL DEVICE AND ELECTRONIC APPARATUS

BACKGROUND

1. Technical Field

The present invention relates to an electro-optical device including light emitting elements such as organic EL (electro luminescent) elements, and to an electronic apparatus including such an electro-optical device.

2. Related Art

An OLED (organic light emitting diode), that is, an organic EL element can be exemplified as a thin and lightweight light emitting source. The organic EL element has a structure in which at least one layer of an organic thin film including an organic material is interposed between a pixel electrode and an opposing electrode. The pixel electrode functions as a positive electrode, and the opposing electrode functions as a negative electrode, for example. When a current flows between both of them, electrons and holes are recombined in the organic thin film. As a result, the organic thin film or the organic EL element emits light.

As such an organic EL element and the image display device including the same, those disclosed in JP-A-2007-133283 are known.

The organic EL element as described above is driven by a drive circuit with an appropriate configuration. As an example of the drive circuit, there can be exemplified a drive circuit which supplies a current flowing between a drain and source of a drive transistor to the organic EL element in accordance with a gate potential of the drive transistor. In this case, it is possible to adjust the light-emission luminance of the organic EL element by adjusting the gate potential.

However, such a drive circuit has various problems to be solved. For example, one of the problems is a variation in characteristics such as mobility or a threshold voltage of the drive transistor. The image display device as described above is generally provided with multiple organic EL elements and the drive circuit including the drive transistors provided for each organic EL element. However, if each of the characteristics of the plurality of drive transistors varies due to variations in various parameters for the manufacturing process, a variation also occurs in the adjustment of light-emission luminance of each organic EL element. As a result, it becomes difficult to improve qualities of displayed images.

A technique relating to such a problem is disclosed in above-mentioned JP-A-2007-133283. That is, JP-A-2007-133283 discloses the technique to execute a mobility compensation operation for a drive circuit with a configuration in which a light emitting control transistor, a drive transistor, and an organic EL element are connected in series to each other and a data writing transistor is connected to a gate of the drive transistor. This mobility compensation operation according to JP-A-2007-133283 is performed between the following two operations: (1) an operation of writing a data potential to the gate of the light emitting control transistor (writing operation) while the light emitting control transistor is turned off and the data writing transistor is turned on; and (2) an operation of supplying a current of the drive transistor to the organic EL element (light emitting operation) while the light emitting control transistor is turned on and the data writing transistor is turned off. Specifically, the mobility compensation operation includes a step of performing (3) an operation of causing a current in accordance with the mobility to flow through the drive transistor while both the light emitting control transistor and the data writing transistor are turned on (refer to the time period between "T6" and "T7" in FIG. 4 or [0031] of JP-A-2007-133283).

The above-mentioned operation of (3) causes a source potential of the drive transistor to rise due to the current flowing therethrough, which results in a decrease in a gate-to-source voltage. However, since the damping of the current depends on the mobility of each drive transistor, performing the operation of (3) during the same time period for each drive transistor causes each gate-to-source voltage for respective drive transistors to have a value in accordance with the magnitude of the mobility of each (that is, the variation in the mobility characteristic of each drive transistor can be compensated).

However, the technique disclosed in JP-A-2007-133283 has the following problem. That is, it is extremely important to exactly manage the time period during which the operation of (3) is performed in order to preferably carry out the operation. In other words, the timing at which the light emitting control transistor is turned on, which distinguishes between the above-mentioned operations of (1) and (3), and the timing at which the data writing transistor is turned off, which distinguishes between the above-mentioned operations of (3) and (2), should be managed exactly for each drive circuit. If not, the damping of the current unfavorably varies for each drive transistor. That is, the current is excessively damped for some drive transistors and insufficiently damped for other drive transistors. As a result, a desired effect of mobility compensation cannot be secured.

However, it is difficult in general to exactly manage such timings. For example, when the drive circuit has a matrix-shaped arrangement, it is necessary to supply a control signal for turning off a data writing transistor arranged in a row to the data writing transistor. However, parasitic capacitance and parasitic resistances included in a supply line of the control signal may cause a distortion of the waveform of the signal as it goes through the supply line. As a result, there is a danger that a difference may occur between the opening and closing timings of the data writing transistors in the first and the last drive circuits in the row.

SUMMARY

An advantage of some aspects of the invention is to provide an electro-optical device and an electronic apparatus capable of solving at least a part of the above-mentioned problems.

In addition, another advantage of some aspects of the invention is to provide an electro-optical device and an electronic apparatus capable of solving the problems relating to the electro-optical device and the electronic apparatus with such configurations.

According to a first aspect of the invention, in order to solve the above mentioned problems, there is provided an electro-optical device including: a plurality of unit circuits provided correspondingly to intersections between a plurality of scanning lines and a plurality of data lines; and a scanning line drive circuit which supplies a control signal for controlling the unit circuits to the plurality of scanning lines. Here, each of the plurality of unit circuits includes: a light emitting element which emits light with an intensity in accordance with a magnitude of a drive current; a drive transistor which outputs the drive current when a data potential supplied via the data line is supplied to a gate thereof; a light emitting control transistor which determines whether to flow the drive current through the drive transistor itself; and a switching element with one end connected to the gate of the drive transistor and the other end connected to the data line. In addition, each of the plurality of scanning lines includes a light emitting control line which serves as a channel of a light emitting control signal, the light emitting control signal being the control signal which directs the gate of the light emitting control transistor arranged along an extending direction of the scanning line to shift the light emitting control transistor between a conductive state and a non-conductive state. Moreover, the scanning line drive circuit includes: a first light emitting control line drive circuit connected to one end of the light emitting control line; and a second light emitting control line drive circuit connected to the other end of the light emitting control line. Here, the first and second light emitting control line drive circuits supply the light emitting control signal for shifting the light emitting control transistor to the conductive state to the light emitting control line from both ends thereof at a predetermined timing.

According to the invention, since the light emitting control signal is supplied from both ends of the light emitting control line at a predetermined timing, the possibility that the waveform of the light emitting control signal is distorted at a root end and a termination end thereof is extremely low even if the light emitting control line has parasitic resistances and parasitic capacitances. Therefore, it is possible to manage with high precision the time points at which the light emitting control transistor shifts to a conductive state if the light emitting control signal includes a square waveform and the light emitting control transistor shifts to a conductive state between two occurrences of level shifts by which the light emitting control transistor forms the square waveform, for example. As a result, if the above-mentioned "predetermined timing" is a "timing at which a mobility compensation operation is carried out", it is possible to manage with high precision the time points thereof for all the unit circuits.

In the electro-optical device of the invention, it is preferable that each of the plurality of scanning lines includes, in addition to the light emitting control line, a writing control line which serves as a channel of a writing signal, the writing signal being the control signal which directs the switching element to shift between a conductive state and a non-conductive state, which determines whether to supply the data potential to the gate of the drive transistor. In this case, the first and second light emitting control line drive circuits may supply the light emitting control signal to the light emitting control line from both ends thereof to the light emitting control line in the course of the supply of the writing signal which shifts the switching element to the conductive state to the writing control line.

With such a configuration, the light emitting control signal to shift the light emitting control transistor to a conductive state is supplied to the light emitting control line from both ends thereof while the switching element is maintained in a conductive state. Accordingly, while the data potential is supplied to the gate of the drive transistor, a current flows between the source and drain thereof. Thus, since the magnitude of the current or the degree of the damping depends upon the mobility of the drive transistor, it is possible to preferably carry out the mobility compensation operation for all the drive transistors if the time period during which the light emitting control transistor is in a conductive state is always a predetermined time for all the unit circuits.

Regarding this point, since the time during which the light emitting control transistor is maintained in a conductive state is managed with high precision in this invention as described above, the time period during which the mobility compensation operation is performed is also managed precisely. Therefore, it is possible to more preferably or more effectively carry out the mobility compensation operation according to this configuration.

In particular, the light emitting control signal is supplied to the light emitting control line "in the course of" maintaining the switching element in a conductive state according to this configuration. That is, while the state of the writing signal is maintained in one of the high level or the low level (the one which shifts the "switching element" to a conductive state), the light emitting control transistor shifts from a non-conductive state to a conductive state, then from a conductive state to a non-conductive state. Accordingly, the mobility compensation operation is carried out based only upon the states of the light emitting control signal in this configuration.

As described above, the mobility compensation operation is managed only by a behavior of the light emitting control transistor or only by a behavior of the light emitting control signal. As a result, the control thereof is more simplified compared with the case in which the time for performing the mobility compensation operation is fixed by using a plurality of transistors, for example.

According to a second aspect of the invention, in order to solve the above mentioned problems, there is provided an electro-optical device including: a plurality of unit circuits provided correspondingly to intersections between a plurality of scanning lines and a plurality of data lines; and a scanning line drive circuit which supplies a control signal for controlling the unit circuits to the plurality of scanning lines. Here, each of the plurality of unit circuits includes: a light emitting element which emits light with an intensity in accordance with a magnitude of a drive current; a drive transistor which outputs the drive current when a data potential supplied via the data line is supplied to a gate thereof; a light emitting control transistor which determines whether to flow the drive current through the drive transistor itself; and a switching element with one end connected to the gate of the drive transistor and the other end connected to the data line. Moreover, each of the plurality of scanning lines includes: a light emitting control line which serves as a channel of a light emitting control signal, the light emitting control signal being the control signal which directs the gate of the light emitting control transistor arranged along an extending direction of the scanning line to shift the light emitting control transistor between a conductive state and a non-conductive state, and a writing control line which serves as a channel of a writing signal, the writing signal being the control signal which directs the switching element to shift between a conductive state and a non-conductive state, which determines whether to supply the data potential to the gate of the drive transistor. Furthermore, the scanning line drive circuit includes: a light emitting control line drive circuit which is connected to one end of the light emitting control line and outputs the light emitting control signal; and a writing control line drive circuit which is connected to one end of the writing control line and outputs the writing signal. Here, the light emitting control line drive circuit is disposed adjacent to an image display region where the plurality of unit circuits is arranged. In addition, the writing control line drive circuit is disposed on an opposite side of the image display region when seen from the light emitting control line drive circuit disposed therebetween.

According to the invention, the light emitting control line drive circuit is disposed closer to the image display region than the writing control line drive circuit. Therefore, the length of the light emitting control line as a channel of the light emitting control signal output from the light emitting control line drive circuit is relatively shortened. As a result, it is possible to manage with high precision the time points at which the light emitting control transistor shifts to a conductive state if the light emitting control signal includes a square waveform and the light emitting control transistor shifts to a conductive state between two occurrences of level shifts by which the light emitting control transistor forms the square waveform, for example.

As described above, the effects and the advantages which can be attained in the second aspect of the invention are the same as those in the first aspect of the invention.

In addition, it is needless to say that the mobility compensation operation as described in the first aspect of the invention (that is, the mobility compensation operation of supplying the light emitting control signal in the course of maintaining the switching element in a conductive state) can be carried out in the invention.

The electro-optical device according to the invention is further provided with a power line as a supply source of the drive current, and the power line may be configured so as not to be disposed between the light emitting control line drive circuit and the image display region.

With this configuration, the light emitting control line does not cross over the power line to reach the image display region. Therefore, it is possible to significantly reduce the possibility that the light emitting control signal is distorted by the parasitic capacitances and the parasitic resistances due to the power line. As described above, it is possible to more effectively attain the above-mentioned advantages of the invention with this configuration.

In this case, the power line may be configured so as to be disposed between the light emitting control line drive circuit and the writing control line drive circuit.

With this configuration, it is possible to attain the same effects and advantages as those in the above-mentioned configuration. In addition, the power line is desirably arranged, thereby implementing a desirable layout of various components such as the light emitting control line drive circuit, the writing control line drive circuit, and the power line.

In addition, since the writing control line drive circuit is disposed outside the power line when seen from the image display region in this configuration, the writing control line reaches the image display region after crossing over the power line. With such a configuration, there is a high possibility that the writing control signal is distorted by the parasitic capacitances and the parasitic resistances due to the power line. As described above, with this configuration, it is possible to suppress a potential variation phenomenon (feedthrough) in the unit circuits in accordance with the level shifts of the writing control signal.

Moreover, according to the electro-optical device of the second aspect of the invention, the light emitting control line drive circuit includes a buffer which outputs the light emitting control signal. The light emitting control line drive circuit may be configured to be disposed adjacent to the image display region such that the buffer is disposed adjacent to the image display region.

This configuration provides a desirable specific example of the case in which the light emitting control line drive circuit "is disposed adjacent to the image display region". That is, in order to implement the above-mentioned advantages of the invention, in particular, in order to exactly manage the time period during which the mobility compensation operation is carried out, it is preferable to avoid the occurrence of distortion in the light emitting control signal as much as possible as described above. If the buffer as a last output stage of the light emitting control line drive circuit is disposed adjacent to the image display region, the occurrence of distortion can be sufficiently avoided.

This configuration has been contrived so as to clarify the above gist of the invention. With such a configuration, it is possible to attain the advantages such as an increase in the freedom of the layout of the various components, which results from employing this configuration.

In the description regarding the scope of Claims, the relationship of the dependency between the above-mentioned first and second aspects of the invention has not been particularly mentioned. However, it is needles to say that the configuration in which both these aspects of the invention are implemented in a single electro-optical device is also within the scope of the invention when viewed from a general viewpoint of the invention. In addition, according to such a configuration in which both these aspects of the invention are simultaneously implemented, it is possible to more effectively attain the advantages of the invention since both of the aspects can suppress the occurrence of the distortion in the light emitting control signal.

According to a third aspect of the invention, there is provided an electronic apparatus including: the electro-optical device according to the above aspects of the invention.

In this case, the electronic apparatus according to the invention includes one of the above-mentioned various electro-optical devices. Therefore, it is possible to preferably carry out the mobility compensation operation, to thereby display images with high qualities.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
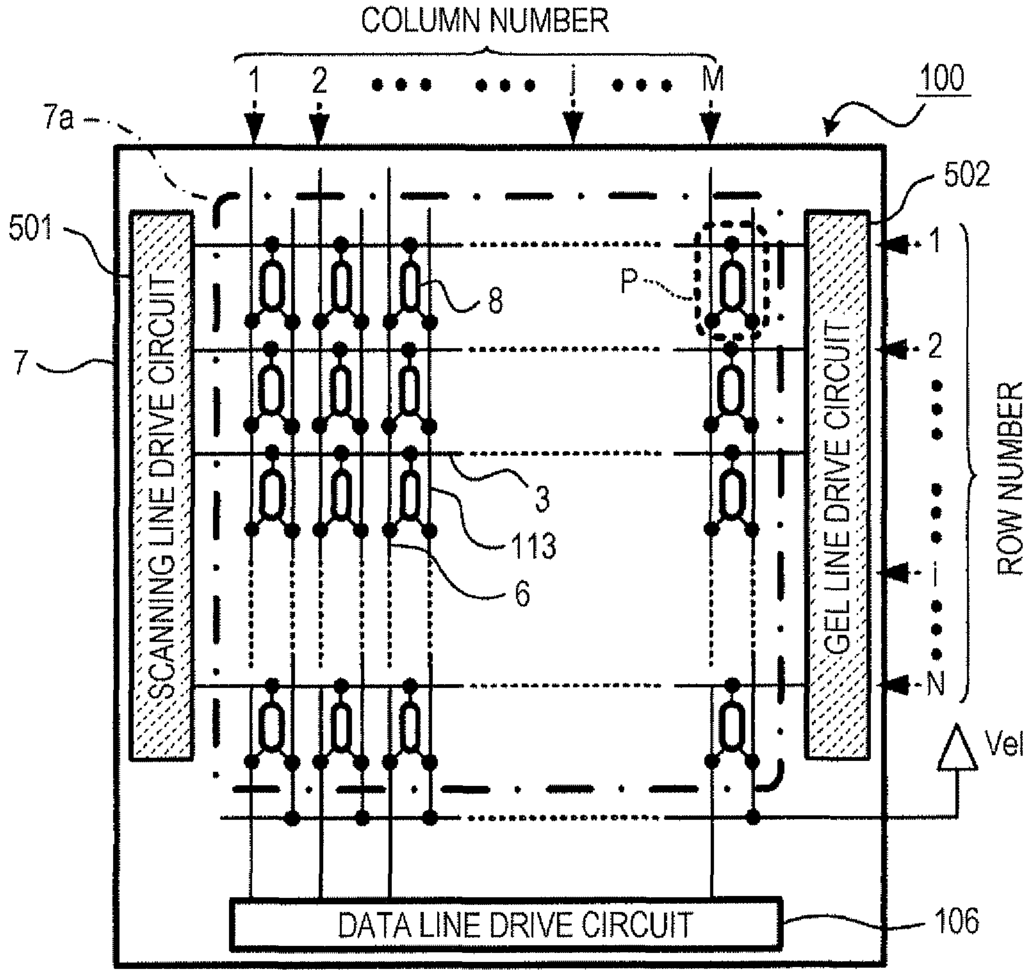
FIG. 1 is a block diagram illustrating an electro-optical device according to a first embodiment of the invention.

Hereinafter, a first embodiment of the invention will be described with reference to FIGS. 1 to 3. In the drawings referred to below, in addition to the above-mentioned FIGS. 1 to 3, the dimensional ratio of each component may be different from that in practice for the sake of explanation.

As shown in FIG. 1, an organic EL device 100 includes an element substrate 7 and various components formed on the element substrate 7. The various components include organic EL elements 8, scanning lines 3, data lines 6, power lines 113, a scanning line drive circuit 501, a light emitting control line drive circuit 502 (represented as a "GEL line drive circuit" in FIG. 1, and represented in the same manner in the other drawings), and a data line drive circuit 106.

As shown in FIG. 1, a plurality of organic EL elements (light emitting elements) 8 are provided on the element substrate 7. The plurality of organic EL elements 8 are arranged in a matrix shape with N rows and M columns (N and M are natural numbers). Each organic EL element 8 is constituted by a pixel electrode as a positive electrode and an opposing electrode as a light emitting functional layer and a negative electrode.

An image display region 7*a* is a region on the element substrate 7, in which this plurality of organic EL elements 8 is arranged. A desired image can be displayed on the image display region 7*a* depending upon light emission and non-light emission of the individual organic EL element 8. Hereinafter, a region on a surface of the element substrate 7 other than the image display region 7*a* is referred to as a "peripheral region".

The scanning lines 3 and the data lines 6 are arranged so as to correspond to each row and each column of the organic EL elements 8 arranged in a matrix shape. More specifically, as shown in FIG. 1, the scanning lines 3 extend in a horizontal direction in the drawing, and are connected to the scanning line drive circuit 501 formed in the peripheral region. Meanwhile, the data lines 6 extend in a vertical direction in the drawing, and are connected to the data line drive circuit 106 formed in the peripheral region. In addition, the power lines 113 are arranged so as to be parallel to the data lines 6. A high power supply potential Vel is supplied to the power line 113.

The above-mentioned scanning line drive circuit 501 is a circuit to sequentially select each scanning line 3. In addition, the data line drive circuit 106 is a circuit to supply a data signal to each organic EL element 8 corresponding to the scanning line 3 selected by the scanning line drive circuit 501 through each data line 6.

A unit circuit (pixel circuit) P including the organic EL element 8 is provided in the vicinity of each intersection point between each scanning line 3 and each data line 6.

Figure 2:
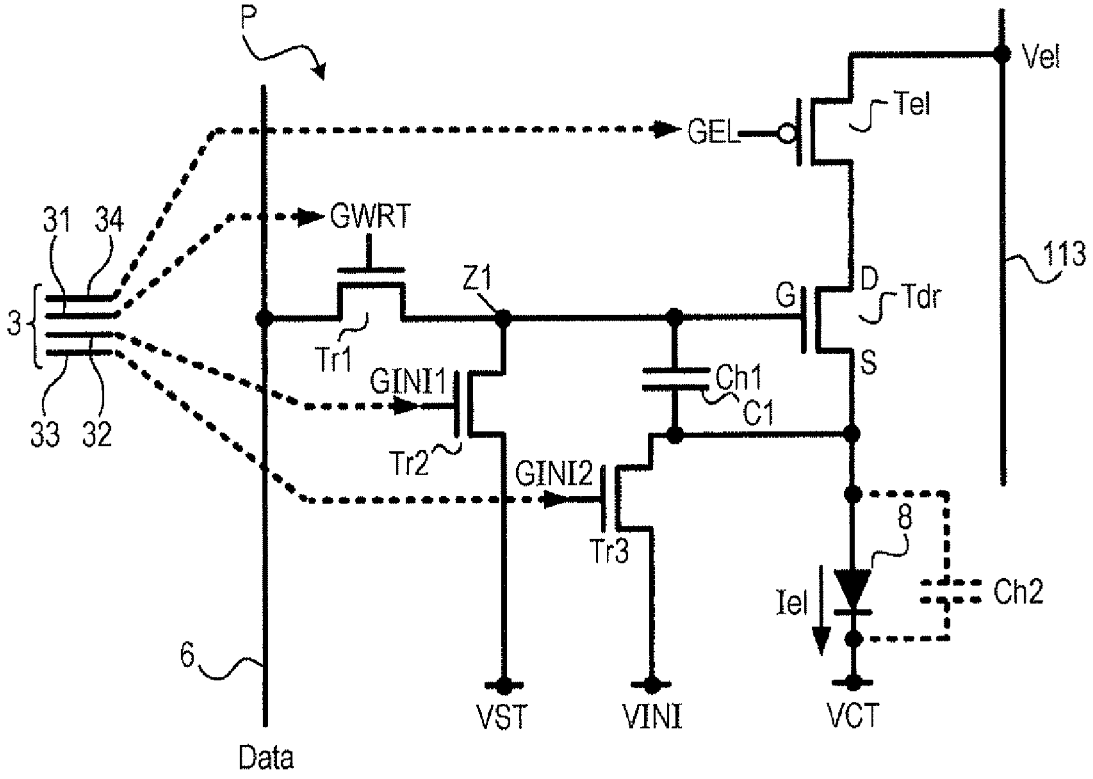
FIG. 2 is a circuit diagram illustrating a detail of a unit circuit constituting an organic EL device shown in FIG. 1.

As shown in FIG. 2, the unit circuit P includes a drive transistor Tdr, a light emitting control transistor Tel, first to third transistors Tr1 to Tr3, and a capacitance element C1 in addition to the organic EL element 8.

Although a scanning line 3 is illustrated as one wiring in FIG. 1 for the sake of explanation, four wirings are provided in practice as shown in FIG. 2. A predetermined signal is supplied to each of the four wirings from the scanning line drive circuit 501. More specifically, a scanning signal GWRT [i], a first compensation control signal GINI1[*i*], a second compensation control signal GINI2[*i*], or a light emitting control signal GEL[i] is supplied to each wiring, respectively. Functions of these signals and the operation of the unit circuit P in response to these signals will be described later. The symbol i used here means a row number in the matrix-shaped arrangement (referring to FIG. 1., since four wirings constitute one scanning line 3, the number of wirings included in all the scanning lines 3 is 4N as a result). Each of these wirings will be referred to as a writing scanning line 31, a first compensation control line 32, a second compensation control line 33, or a light emitting control line 34 in the following description since each signal mentioned above is supplied to each wiring (refer to FIG. 2).

Figure 3:
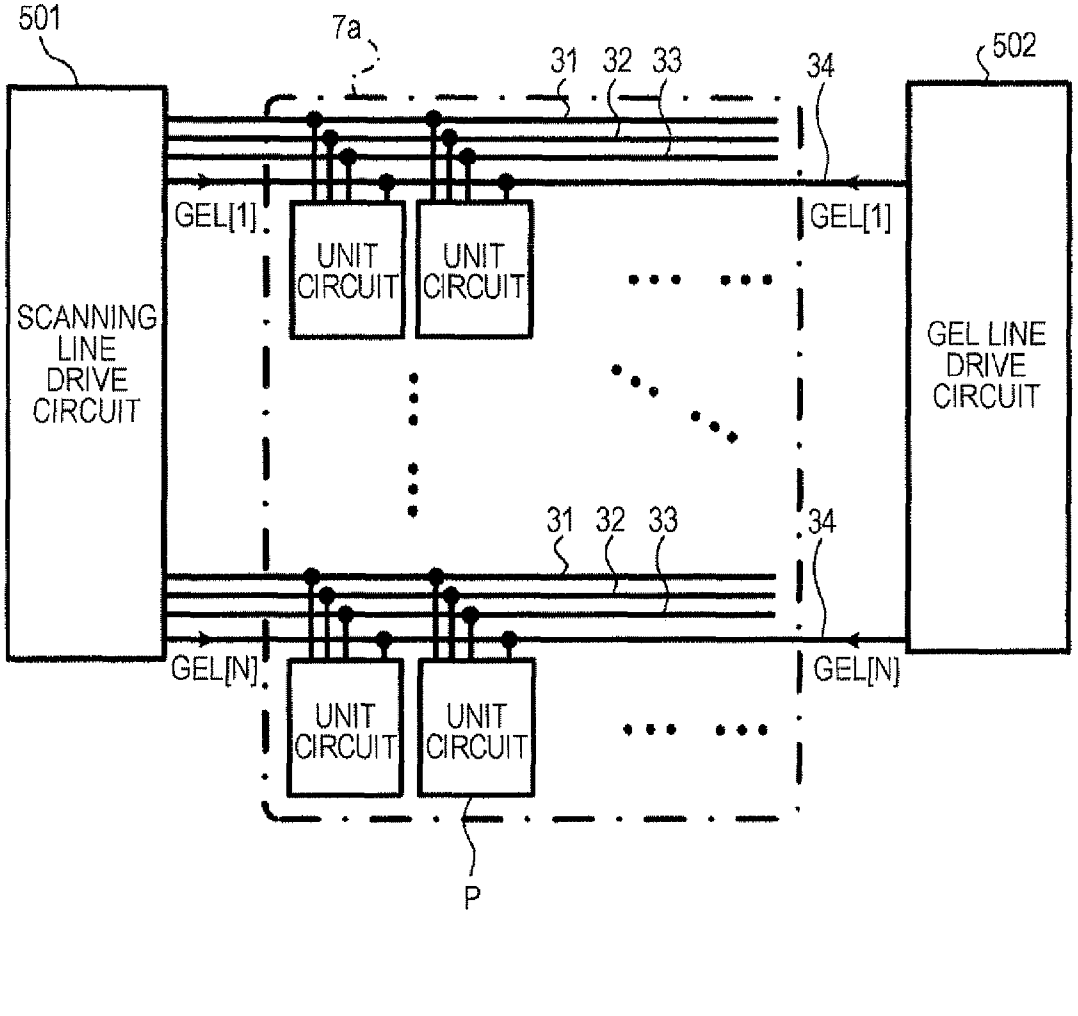
FIG. 3 is an explanatory diagram illustrating a connection state between the unit circuit shown in FIG. 2 and each control line (particularly, each light emitting control line).

The light emitting control line drive circuit 502 is connected only to the light emitting control lines 34 among the above-mentioned wirings as shown in FIG. 3. Accordingly, the light emitting control line drive circuit 502 outputs only the light emitting control signal GEL[i]. With such a configuration, as shown in FIG. 3, only the light emitting control signal GEL[i] is simultaneously input from both ends of the light emitting control line 34 or from both the right and left ends of the image display region 7*a* in the same drawing in a different manner from the other signals.

In addition, the scanning line drive circuit 501 may include the light emitting control line drive circuit corresponding to this light emitting control line drive circuit 502, or may include a writing scanning line drive circuit, a first compensation control line drive circuit, and a second compensation control line drive circuit, each corresponding to each signal (Not all the components are shown in the drawings. Refer to the second and third embodiments to be described later).

Referring again to FIG. 2, the drive transistor Tdr is an n-channel type transistor, and positioned in the passage from the power line 113 to the pixel electrode of the organic EL element 8. A drain (D) of the drive transistor Tdr is connected to a source of the light emitting control transistor Tel.

This drive transistor Tdr is a unit of which the conductive state between the source (S) and the drain (D) (the source-to-drain resistance value) varies in accordance with a gate potential Vg so as to generate a drive current Iel in accordance with the gate potential Vg. In addition, the gate potential Vg varies depending upon the magnitude of the data signal Data supplied through the data line 6.

In such a manner, the organic EL element 8 is driven in accordance with the conductive state of the drive transistor Tdr or the data signal Data.

The light emitting control transistor Tel is a p-channel type transistor, and is positioned between the drive transistor Tdr and the power line 113. The light emitting control signal GEL[i] is supplied to the gate of the light emitting control transistor Tel. When the light emitting control signal GEL[i] shifts to a low level, the light emitting control transistor Tel is turned on, and thus it becomes possible to supply a drive current Tel to the organic EL element 8. As a result, the organic EL element 8 emits light with tones (luminance) in accordance with the drive current Iel. Meanwhile, when the light emitting control signal GEL[i] is in a high level, the light emitting control transistor Tel is maintained in the OFF state, and thus the passage of the drive current Iel is cut off to stop the light emission of the organic EL element 8.

In addition, the pixel electrode of the organic EL element 8 is connected to the power line 113 to which the above-mentioned high power supply potential Vel is supplied through the light emitting control transistor Tel and the drive transistor Tdr. The opposing electrode of the organic EL element 8 is connected to a potential line (not shown) to which a low power supply potential VCT is supplied. The light emitting control transistor Tel performs control to switch between supply and non-supply of the current to the organic EL element 8 as described above. It can be understood that the light emitting control transistor Tel performs control to switch between supply and non-supply of the current to the drive transistor Tdr itself.

The capacitance element C1 is an element in which a dielectric body is inserted between two electrodes. The capacitance value thereof is Ch1. One electrode (the upper electrode in FIG. 2) of the capacitance element C1 is connected to the gate of the drive transistor Tdr. In addition, the other electrode (the lower electrode in FIG. 2) of the capacitance element C1 is connected to the source (S) of the drive transistor Tdr and to the source of the third transistor Tr3 to be described later.

The first transistor Tr1 is a switching element disposed between a node Z1 and the data line 6 to control the electrical connection therebetween. The above-mentioned scanning signal GWRT[i] is supplied to the gate of the first transistor Tr1.

The second transistor Tr2 is a switching element disposed between the potential line to which an initial potential VST is supplied and the node Z1 to control the electrical connection therebetween. The first compensation control signal GINI1[*i*] is supplied to the gate of the second transistor Tr2.

The third transistor Tr3 is a switching element disposed between the supply line of the initial potential VINI and the source of the drive transistor Tdr to control the electrical connection therebetween. The second compensation control signal GINI2[*i*] is supplied to the gate of the third transistor Tr3.

Next, the operations and the effects of the organic EL device 100 with the above-described configuration will be described with reference to FIGS. 4 and 5 in addition to FIGS. 1 to 3 already referred to in the above description.

(i) Initialization: When the first compensation control signal GINI1[*i*] and the second compensation control signal GINI2[*i*] are in the high level, the second transistor Tr2 and the third transistor Tr3 are turned on. As a result, the gate potential Vg and the source potential Vs of the drive transistor Tdr are lowered as shown in FIG. 4 to the initial potential VST and the initial potential VINI, respectively.

In addition, the unit circuit P repeatedly performs the operations from (i) initialization described herein to (v) drive. The operation of (i) initialization is performed after the last operation of (v) drive (light emitting operation) is terminated, that is, after the light emitting control signal GEL[i] shifts from the low level to the high level. The decreases in both the gate potential Vg and the source potential Vs before the decrease only in the source potential Vs as shown in the leftmost part of the graph in FIG. 4 correspond to the shift of the light emitting control signal GEL[i].

(ii) Vth Compensation: Subsequently, the second compensation control signal GINI2[*i*] shifts to the low level, and then the light emitting control signal GEL[i] shifts to the low level. Accordingly, the third transistor Tr3 is turned off, and then the light emitting control transistor Tel is turned on. Therefore, the source potential Vs is released from the supply of the initial potential VST. As a result, the source potential Vs of the drive transistor Tdr starts to increase as shown in FIG. 4 while the drive transistor Tdr and the high power supply potential Vel are conducted to each other, whereby the gate-to-source voltage becomes asymptotic with respect to a threshold voltage Vth. Here, the capacitance element C1 connecting between the gate and the source of the drive transistor Tdr maintains the threshold voltage Vth during such a series of operations (in addition, the capacitance element C1 maintains a voltage suitable for each of the following operations).

As described above, the compensation for the threshold voltage Vth of each drive transistor Tdr is performed in the operation of (ii).

(iii) Data Writing: Next, the light emitting control signal GEL[i] and the first compensation control signal GINI1[*i*] shift to the high and low levels, respectively. In addition, the light emitting control transistor Tel and the second transistor Tr2 are turned off. Meanwhile, the scanning signal GWRT[i] shifts to the high level. As a result, the first transistor Tr1 is turned on. At this time, when the data signal with a certain data potential Vdata is supplied through the data line 6, the potential of the node Z1, that is, the gate potential Vg varies by a voltage corresponding to the added data potential Vdata. Accordingly, the gate-to-source voltage of the drive transistor Tdr becomes Vth+Vdata' as shown in FIG. 4. Here, the relationship of Vdata'=Vdata·(Ch2/(Ch2+Ch1)) is satisfied. In this equation, Ch2 represents the capacitance value of the parasitic capacitance included in the organic EL element 8.

(iv) Mobility Compensation: Next, while the scanning signal GWRT[i] is maintained in the high level, the light emitting control signal GEL[i] is maintained in the low level for a predetermined time period. This causes the light emitting control transistor Tel to turn on again, and the source potential Vs of the drive transistor Tdr starts to increase. FIG. 4 shows that the gate-to-source voltage after the increase of the source potential Vs becomes Vth+Va, which means that it is possible to represent the increase of the source potential Vs by "Vdata'−Va". On the other hand, the gate-to-source voltage of the drive transistor Tdr decreases as a result.

The extents of such an increase of the source potential Vs and such a decrease of the gate-to-source voltage vary in accordance with the respective drive transistors Tdr in the respective unit circuits P, which have different mobility characteristics. In other words, qualitatively, an amount of the increase of the source potential Vs is larger in the transistor Tdr with larger mobility μ, and is smaller in the transistor Tdr with smaller mobility μ.

As described above, the mobility compensation of each drive transistor Tdr is carried out in the operation of (iv).

In addition, the input of the light emitting control signal GEL[i] from both ends of the image display region 7*a* by the light emitting control line drive circuit 502 and the scanning line drive circuit 501 has a special meaning in such a mobility compensation operation, which will be described later.

(v) Driving: While the scanning signal GWRT[i] shifts to the low level and the first transistor Tr1 is turned off, the light emitting control signal GEL[i] shifts to the low level three times, and thereby the light emitting control transistor Tel is turned on. This causes the drive current Tel with a magnitude in accordance with the gate potential Vg to be supplied from the drive transistor Tdr to the organic EL element 8, and the organic EL element 8 emits light.

Next, description will be made regarding the relationship between the above-mentioned (iv) mobility compensation operation and the input of the light emitting control signal GEL[i] from both ends of the image display region 7*a*.

First, the organic EL device 100 according to the first embodiment has the unit circuits P arranged in a matrix shape as described above (refer to FIG. 1), and the light emitting control transistors Tel are also arranged in a matrix shape. Accordingly, a plurality of light emitting control transistors Tel belong to each row of the matrix-shaped arrangement as shown in FIG. 5 (FIG. 5 shows only the ones belonging to one row). In order to control the plurality of light emitting control transistors Tel, the light emitting control line 34 which is one of the four wirings constituting the scanning line 3 is used as descried above (refer to FIG. 2 and the description thereof).

Figure 5:
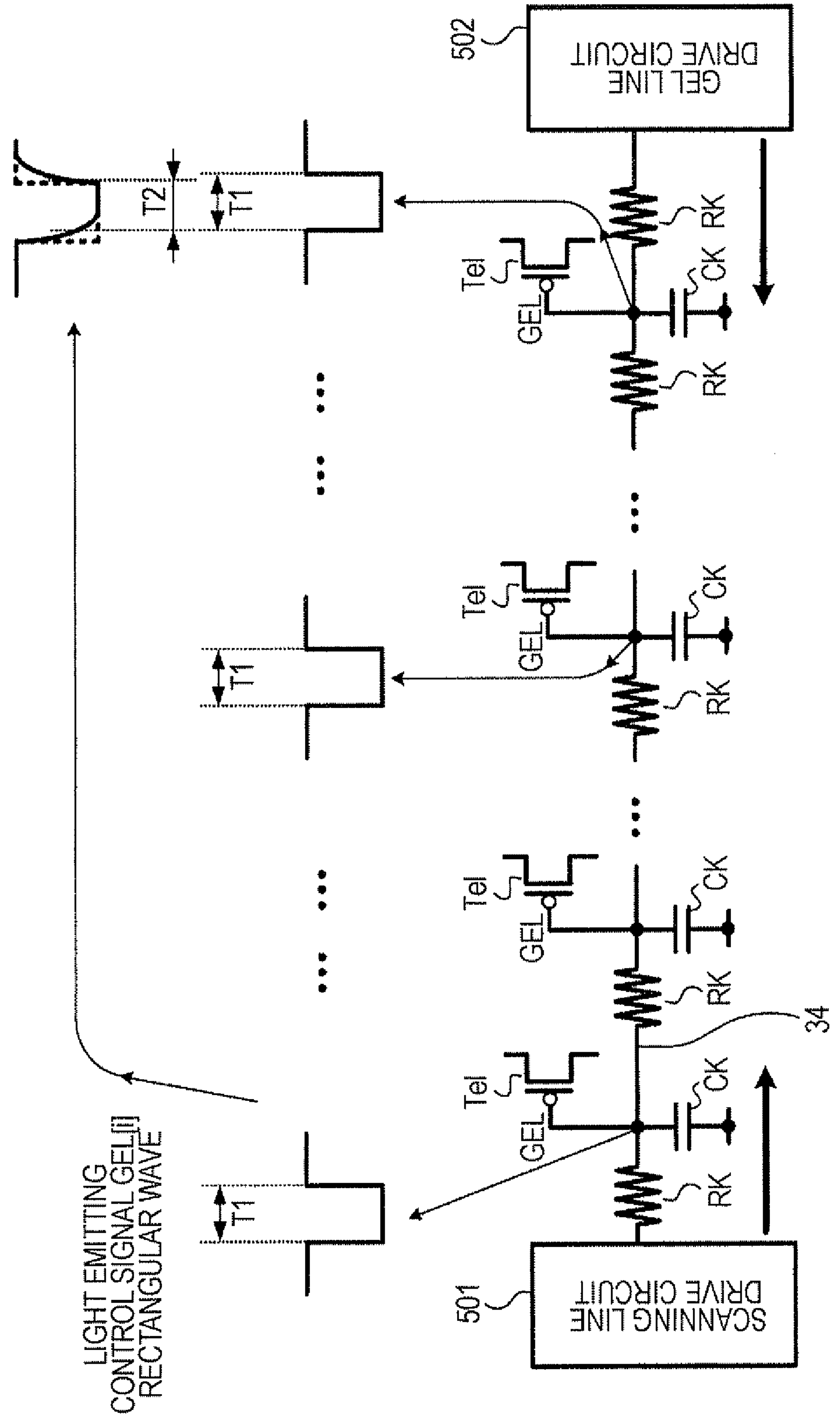
FIG. 5 is an explanatory diagram illustrating that a signal with larger distortion is supplied to a light emitting control transistor positioned far from a scanning line drive circuit than to a light emitting control transistor positioned closer to the scanning line drive circuit, and that the first embodiment decreases such a concern.

However, the parasitic resistances RK and the parasitic capacitances CK exist in this light emitting control line 34 as described in FIG. 5. Therefore, the parasitic resistances RK and the parasitic capacitance CK may cause a distortion of the waveform of the signal supplied to the light emitting control line 34.

In practice, when the light emitting control signal GEL[i] has a "rectangular waveform", it is possible to supply the light emitting control signal GEL[i] with a desired rectangular waveform to the light emitting control transistor Tel positioned in the vicinity of the scanning line drive circuit 501 as a source for supplying signals. However, it is difficult to supply the same to the light emitting control transistor Tel positioned further away from the scanning line drive circuit 501. That is, as shown in the upper part of FIG. 5, time points at which the light emitting control signal GEL[i] reaches predetermined levels are delayed for both the time points of rising edge and falling edge of the signal. This tends to be more noticeable as the light emitting control transistor Tel is positioned further away from the scanning line drive circuit 501. As a result, the time period during which the light emitting control transistors Tel is maintained to be ON state varies for each light emitting control transistor Tel.

However, a problem may arise if such a phenomenon occurs during the above-mentioned (iv) mobility compensation operation. That is, as described above, the mobility compensation operation according to the first embodiment requires the adjustment of the extent of the increase of the source potential Vs in accordance with a degree of the mobility of each drive transistor Tdr, and is carried out in order to consequently compensate the variation of the mobility by appropriately adjusting the time during which the mobility compensation operation is performed.

Figure 6:
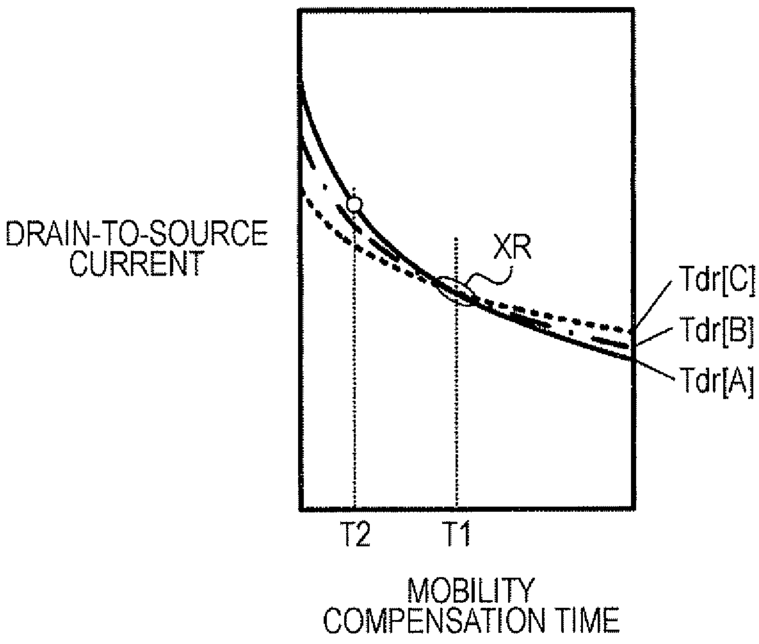
FIG. 6 is a graph illustrating a variation in drain-to-source current of a drive transistor during a time period when a mobility compensation operation is performed ((the mobility of) each drive transistor, which has a different mobility, is a parameter).

That is, when the mobility characteristics are deteriorating from the drive transistor Tdr[A] to the drive transistor Tdr[C] in this order, the damping of the current flowing through the drive transistors Tdr[A] to Tdr[C] increases in the same order as shown in FIG. 6. Therefore, it is possible to assume that there is a region XR which has a certain range including the curves shown in FIG. 6 representing the variations of the mobility of each of the drive transistors Tdr[A] to Tdr[C].

Optimal mobility compensation time T1 can be appropriately set assuming the existence of such a region XR (refer to FIG. 6).

However, if such optimal mobility compensation time T1 varies due to the distortion of the light emitting control signal GEL[i] as described above with reference to FIG. 5, it is difficult to optimally carry out the mobility compensation operation. FIG. 6 shows an example where the mobility compensation operation of the drive transistor Tdr[A] is terminated at the time point departing from the region XR if the mobility compensation time becomes T2 regardless of the fact that it is supposed to be T1. It is easy to assume that the drive transistor Tdr[A] in such a case may be included in the unit circuit P having therein the light emitting control transistor Tel positioned in the rightmost part of FIG. 5, which is the furthest away from the scanning line drive circuit 501.

If so, the possibility that the optimal mobility compensation can be carried out for each drive transistor Tdr is extremely lowered.

The first embodiment can effectively solve the above-mentioned problem because the light emitting control signal GEL [i] is simultaneously input from both ends of the image display region 7*a* by the scanning line drive circuit 501 and the light emitting control line drive circuit 502. That is, in this case, the light emitting control line drive circuit 502 supplies the light emitting control signal GEL[i] which has little distortion to the light emitting control transistor Tel positioned further away from the scanning line drive circuit 501 as shown in FIG. 5. There is still a possibility that the distortion will occur in the light emitting control signals GEL[i] from the scanning line drive circuit 501 and from the light emitting control line drive circuit 502 as the light emitting control signal GEL[i] moves away from those two circuits. However, it is obvious that the first embodiment has many more advantages compared with the normal case in which there is no light emitting control line drive circuit 502 (refer to the upper part of FIG. 5).

As described above, according to this embodiment, it is possible to appropriately manage the time period during which the light emitting control transistor Tel is maintained in the ON state regardless of the distance between the scanning line drive circuit 501 and the light emitting control transistor Tel. Accordingly, it is possible to extremely effectively carry out the mobility compensation operation according to this embodiment.

According to the organic EL device 100 and the unit circuit P as described above, the following advantages can be achieved.

(1) According to the organic EL device 100 of the first embodiment, the light emitting control signal GEL[i] is simultaneously input from both ends of the image display region 7*a* at least during the mobility compensation operation as described above. Therefore, it is possible to carry out the appropriate mobility compensation operation on the basis of the optimal mobility compensation time. Accordingly, it is possible to suppress the variation of the light emitting luminance of the organic EL elements 8, thereby implementing the image display with higher quality.

(2) Moreover, in the first embodiment, the mobility compensation operation (especially, the time period for performing the same) is managed only by the behavior of the light emitting control transistor Tel or only by the behavior of the light emitting control signal GEL[i]. Therefore, it is possible to more effectively achieve the above-mentioned advantage of (1) and to simplify the configuration for the control thereof.

According to a related art, a method for fixing a time period for performing the mobility compensation is employed in some cases by associating the shift between the ON state and OFF state of each transistor as shown in FIG. 2. More specifically, when the operations of (1) turning off the light emitting control transistor and turning on the data writing transistor, (3) turning on both the light emitting control transistor and data writing transistor, and (2) turning on the light emitting control transistor and turning off the data writing transistor are performed in the order of (1), (3), and (2), the mobility compensation time is fixed by the shift from the OFF state to the ON state of the light emitting control transistor (from (1) to (3)) and by the shift from the ON state to the OFF state of the data writing transistor (from (3) to (2)).

Figure 4:
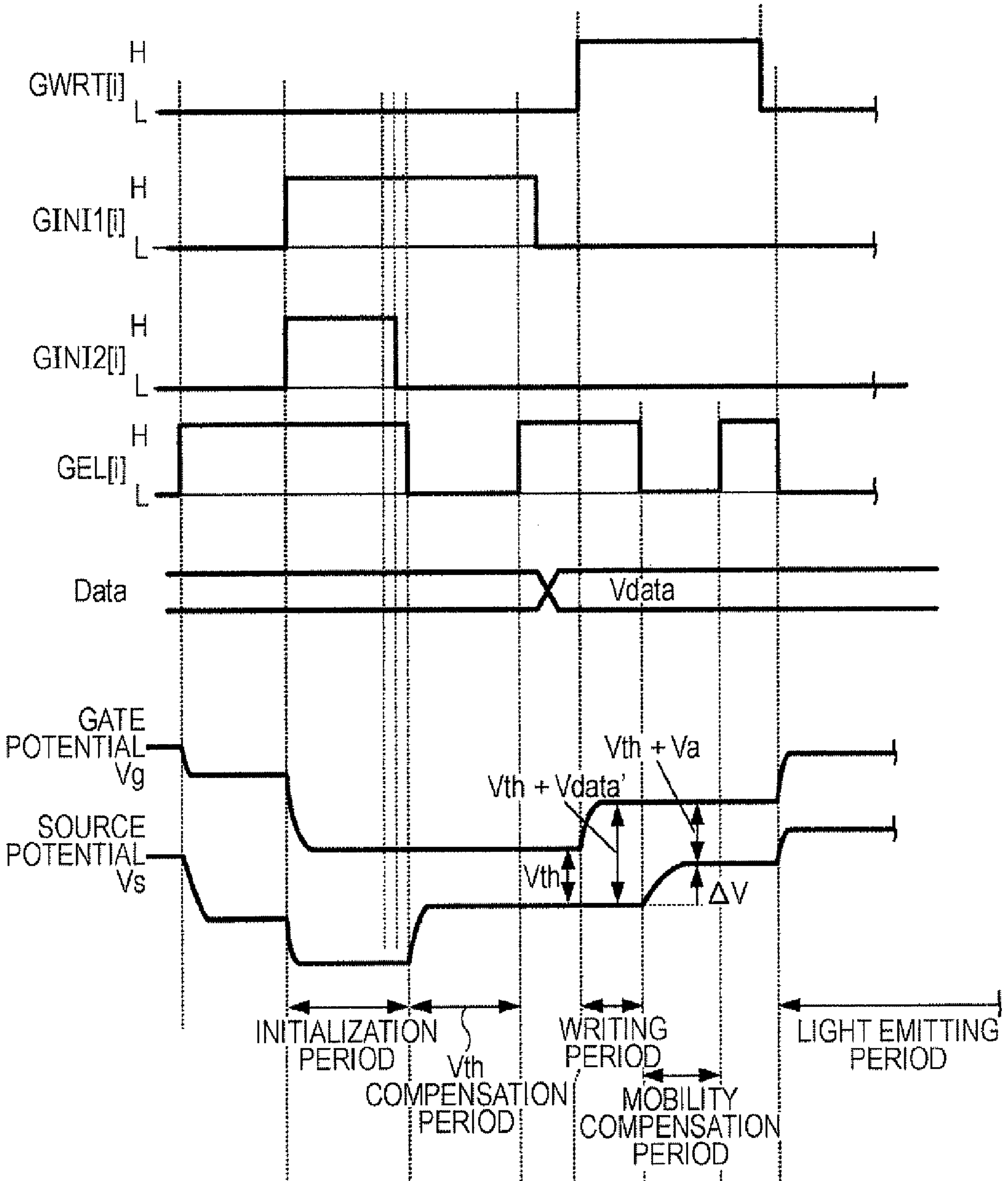
FIG. 4 is a timing chart illustrating operations of the unit circuit shown in FIG. 2.

However, when a plurality of transistors are involved in this manner, it is necessary to consider the possibility that the distortions or delays as shown in FIG. 4 occur in all signals for controlling the transistors. As a result, it is also necessary to consider the relationship between both signals (for example, which signal has a longer delay) for the management of the mobility compensation time. Accordingly, it becomes more difficult to maintain the optimality of the mobility compensation time.

This embodiment of the invention has more advantages from the view point as described above. In other words, the mobility compensation time is determined only by the behavior of the light emitting control signal GEL[i] in this embodiment as described above. Therefore, it is not necessary to consider the relationship of the plurality of signals. Accordingly, it is possible to easily maintain the optimality of the mobility compensation time.

However, the above description does not mean that the embodiment of the invention excludes the specification for fixing the mobility compensation time by the use of the plurality of the transistors in a positive manner.

In this case, however, with reference to FIG. 2 along with the above example, the time for opening and closing both the light emitting control transistor Tel and the first transistor Tr1 (that is, the "data writing transistor" in the above mentioned example) should be managed precisely. Therefore, it is preferable to input not only the light emitting control signal GEL [i] but also the scanning signal GWRT[i] from both ends of the image display region 7*a* in a specification such as that shown in FIG. 1, 3, or 5.

Second Embodiment

Hereinafter, a second embodiment of the invention will be described with reference to FIG. 7. According to the second embodiment, the scanning line drive circuit has a different specification, and other configurations, operations, and effects thereof are the same as those of the first embodiment. Therefore, description will be made mainly of different points, and description of the other points will be simplified or omitted. In addition, elements other than the elements which are necessary for the description of the features of the second embodiment are not shown in FIG. 7.

Figure 7:
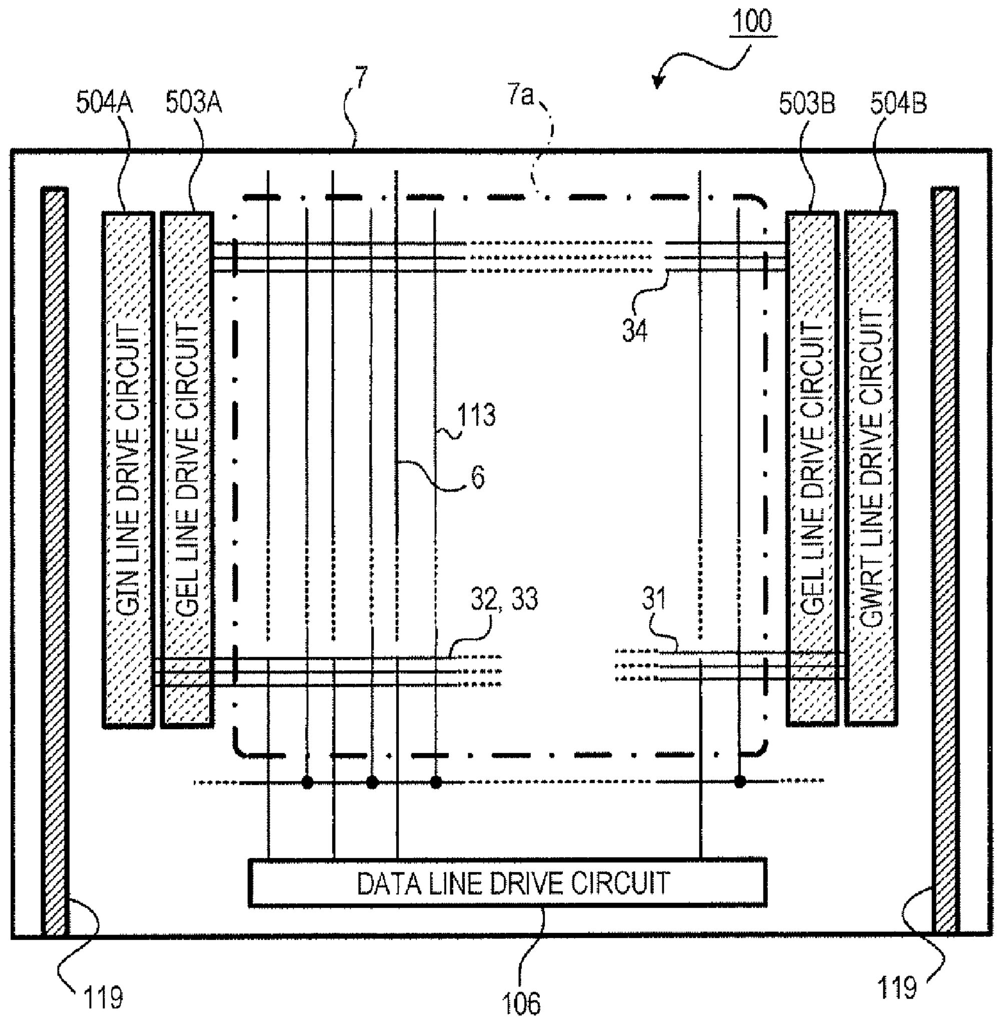
FIG. 7 is a block diagram illustrating an electro-optical device according to a second embodiment of the invention.

According to the second embodiment, the scanning line drive circuit has a configuration including drive circuits for signals for driving the unit circuits P, that is, the scanning signal GWRT[i], the first compensation control signal GINI1 [*i*], the second compensation control signal GINI2[*i*], and the light emitting control signal GEL[i] as shown in FIG. 7. That is, the scanning line drive circuit includes a writing scanning line drive circuit 504B for the scanning signal GWRT[i], first and second compensation control line drive circuits 504A for the first and second compensation control signals GINI1[*i*] and GINI2[*i*] (hereinafter, simply referred to as a "compensation control line drive circuit 504A" in some cases), and light emitting control line drive circuits 503A and 503B for the light emitting control signal GEL[i].

FIG. 7 integrally shows the drive circuits for the first and second compensation control signals GINI1[*i*] and GINI2[*i*] for the simplification of the drawing (the drive circuits are shown as a "GIN line drive circuit" in FIG. 7. Hereinafter, the other drawings show the circuits in the same manner).

In addition, the writing scanning line drive circuit 504B is shown as a "GWRT line drive circuit" in FIG. 7 (Hereinafter, the other drawings show the circuit in the same manner).

Among the above mentioned circuits, The light emitting control line drive circuits 503A and 503B are provided in the vicinities of both the ends of the image display region 7*a* as shown in FIG. 7. The light emitting control line 34 is connected to both the light emitting control line drive circuit 503A and 503*b*. Accordingly, the light emitting control signal GEL[i] is input from both ends of the image display region 7*a* in the second embodiment, and this point is exactly the same as in the first embodiment.

On the other hand, the compensation control line drive circuit 504A is disposed further on the left side of the light emitting control line drive circuit 503A positioned in the left part of FIG. 7. In addition, the writing scanning line drive circuit 504B is disposed further on the right side of the light emitting control line drive circuit 503B positioned in the right part of FIG. 7.

According to the second embodiment, it is obvious that the effects and the advantages which are not essentially different from those in the first embodiment can be attained since the light emitting control signal GEL[i] is input from both ends of the image display region 7*a* as described above.

Furthermore, the following advantages can be also attained according to the second embodiment. That is, in the second embodiment, the light emitting control line drive circuits 503A and 503B are positioned closer to the image display region 7*a* than the drive circuits (504A and 504B) for each control signal required for driving the unit circuit P. Accordingly, it is possible to consider that there is less danger that distortion will occur in the light emitting control signal GEL [i] output from the light emitting control line drive circuit 503A and 503B arranged as described above in comparison with the first embodiment.

As described above, it is possible to expect more effects and advantages according to the second embodiment compared with the first embodiment.

In addition, the scanning line drive circuit is generally provided with various elements such as a shift resistor, a level shifter, and a buffer. However, these elements do not all need to be adjacent to the image display region 7*a* in order to achieve the above-mentioned advantages unique to the second embodiment.

Figure 8:
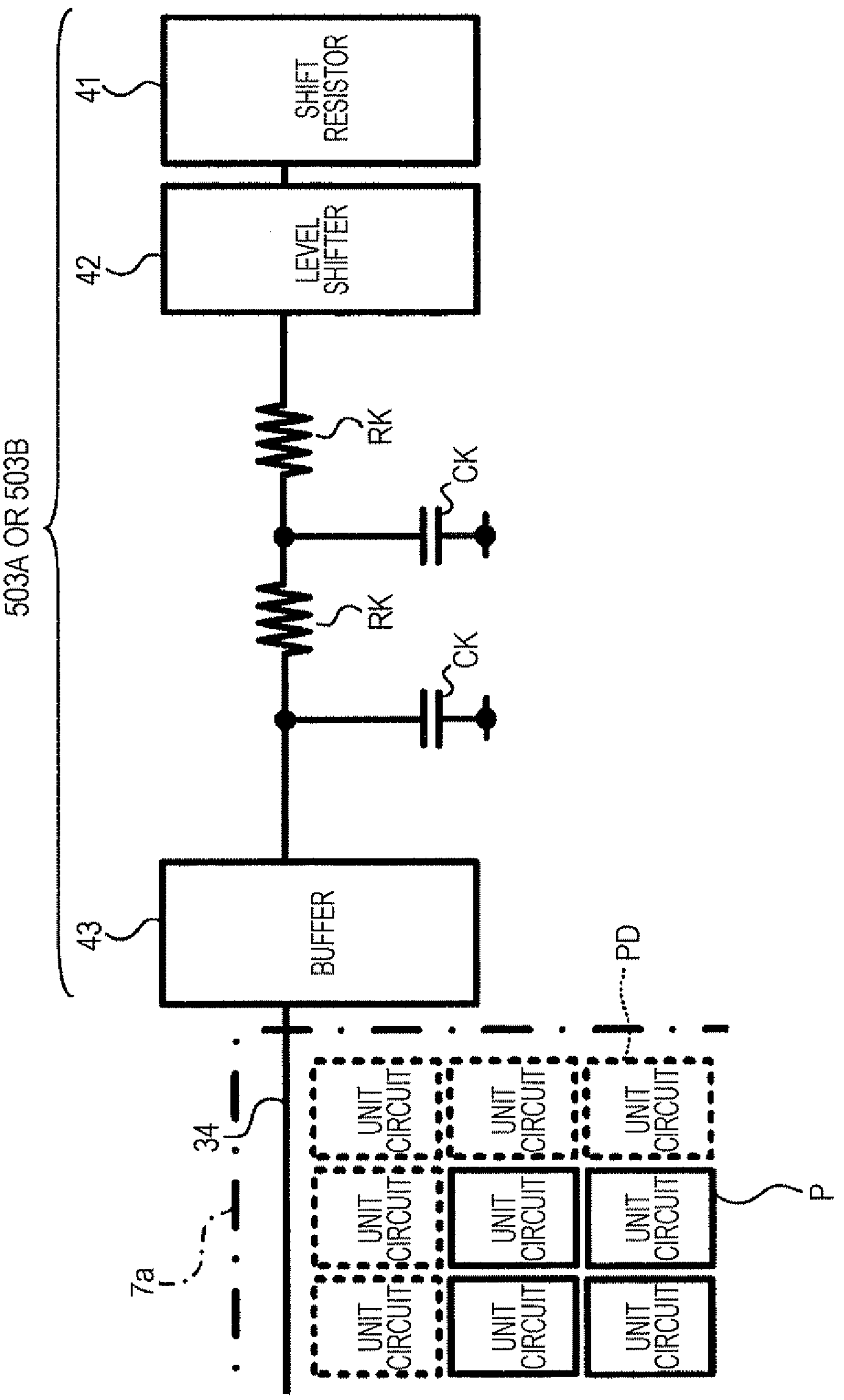
FIG. 8 is an explanatory diagram illustrating a modified example of FIG. 7.

That is, FIG. 8 shows an example where each of the light emitting control line drive circuits 503A and 503B is configured by a shift resistor 41, a level shifter 42, and a buffer 43. In this example, only the buffer 43 among these three is disposed adjacent to the image display region 7*a*.

As described above, if only the buffer 43 as an output circuit in the last stage is disposed adjacent to the image display region 7*a*, it is possible to correct the distortion of the light emitting control signal GEL[i] even when there are the parasitic capacitances CK and the parasitic resistances RK as shown in the drawing in the wiring between the level shifter 42 and the buffer 43.

Accordingly, it is possible to attain the same effects and advantages as described above even with the specification shown in FIG. 8. Furthermore, it is preferable to set the size of the buffer 43 as large as possible in order to effectively attain such advantages. More specifically, it is preferable to set the size of the buffer 43 larger than the sizes of the buffers for other control signals, that is, the sizes of the buffers in the writing scanning line drive circuit 504B and the compensation control line drive circuit 504A.

In addition, the elements on the element substrate 7, which may cause the parasitic capacitances CK and the parasitic resistances RK shown in FIG. 8, may be a power line 119 shown in FIG. 7, or various circuit elements and wirings which constitute an electrostatic protection circuit, for example. In the former case, the power line 119 is disposed such that it is interposed between the level shifter 42 and the buffer 43, both of which constitute the light emitting control line drive circuit 503A or 503B, in the different manner from that in FIG. 7. Even in such a case, it is possible to attain the advantages unique to the second embodiment.

In addition, although the power lines 119 may include a power line for a positive electrode (refer to Vel in FIG. 2), a power line for a negative electrode (refer to VCT in FIG. 2), or the like, FIG. 7 shows the power lines 119 as a single line for the simplification of the drawing. Moreover, these power lines for the positive electrode and for the negative electrode are provided in different regions on the element substrate 7. For example, one of the power lines for the positive electrode and the power line for the negative electrode is provided so as to extend in a vertical direction along the left side or the right side of the element substrate 7 in FIG. 7, and the other is provided so as to extend in a horizontal direction along the upper side or the lower side of the element substrate 7. In such a case, the level shifter 42 and the buffer 43 shown in FIG. 8 are provided so as to be across only one power line for the positive electrode or for the negative electrode (meanwhile, the level shifter 42 and the buffer 43 are provided so as to be across the two power lines if the power lines 119 include both the power lines for the positive electrode and for the negative electrode). In both cases, such a difference does not essentially affect the effects and the advantages as described above. This is because what is important for the effects and the advantages is the existence and non-existence of the distortion of the signal caused by the parasitic capacitances CK and the parasitic resistances RK. In addition, this can be applied to a third embodiment which will be described later.

Furthermore, in the second embodiment, when the light emitting control line drive circuit 503A or 503B or the buffer 43 is disposed adjacent to the "image display region 7*a*", attention should be paid to the following points.

That is, the image display region 7*a* means a region in which a plurality of organic EL elements 8 are arranged as described above. Here, some of the organic EL elements 8 which are not involved in the light emitting at all (that is, the organic EL elements 8 which are not involved in the configuration of the display image) are arranged so as to form the outermost part of the image display region 7*a* in some cases. FIG. 8 shows such unit circuits PD which are so-called dummies (hereinafter, referred to as "dummy circuits PD") by dashed lines. In such a case, if the term "image display region" is interpreted for form's sake, it is possible to assume a region which is formed by connecting outermost parts of the unit circuits P represented by solid lines in FIG. 8. However, the "image display region" according to the invention is not to be interpreted for form's sake in such a manner. In short, the "image display region" can include therein the dummy circuits PD as shown in FIG. 8.

Third Embodiment

Hereinafter, a third embodiment according to the invention will be described with reference to FIG. 9. Also in the third embodiment, the scanning line drive circuit has a different specification, and other configurations, operations, and effects thereof are the same as those in the first embodiment. Accordingly, description will be made mainly of the different points hereinafter, and description of the other points will be simplified or omitted.

Figure 9:
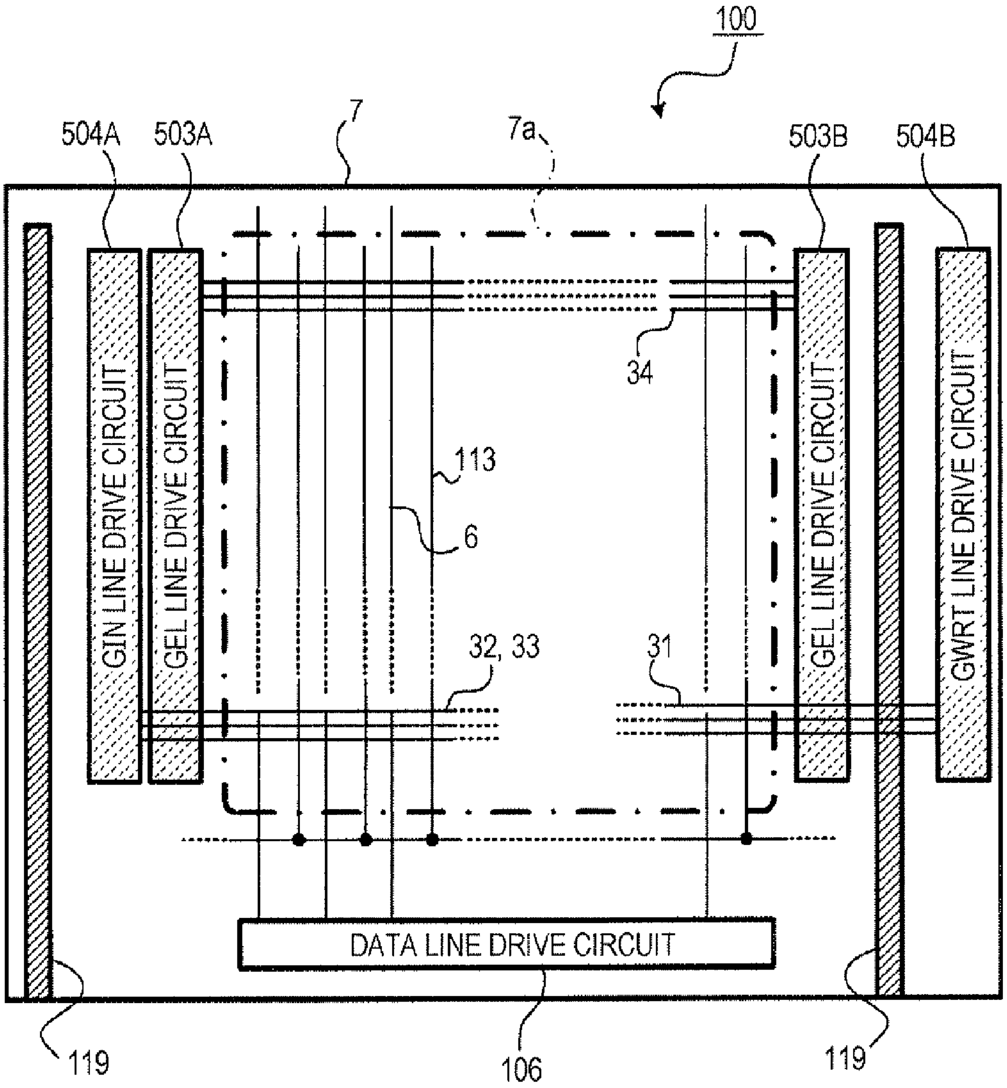
FIG. 9 is a block diagram illustrating an electro-optical device according to a third embodiment of the invention.

According to the third embodiment, the scanning line drive circuit includes the writing scanning line drive circuit 504B corresponding to each signal for driving unit circuits P, the compensation control line drive circuit 504A, and the light emitting control line drive circuits 503A and 503B as shown in FIG. 9 in the same manner as in the second embodiment.

According to the third embodiment, the writing scanning line drive circuit 504B among these drive circuits is disposed outside of the power line 119 as shown in FIG. 9. Therefore, the writing scanning line 31 connected to the writing scanning line drive circuit 504B finally reaches the image display region 7*a* after crossing over the power line 119 and then the light emitting control line drive circuit 503B positioned in the right part of FIG. 9.

According to the third embodiment with such a configuration, the light emitting control signal GEL[i] is input from both ends of the image display region 7*a* in exactly the same manner as in the first and the second embodiments. Therefore, it is obvious that the advantages relating the above configuration can be similarly attained.

Moreover, the following advantages can be also attained according to the third embodiment. That is, the writing scanning line drive circuit 504B is disposed outside the power line 119 as described above in the third embodiment, and which results in a higher possibility that more parasitic capacitances and more parasitic resistances will occur in the writing scanning line 31 connected thereto. As a result, the scanning signal GWRT[i] which travels through the writing scanning line 31 has higher possibility of being distorted massively (refer to FIG. 5).

Here, it is necessary to consider that the scanning signal GWRT[i] is affected by a so-called feed-through. That is, the scanning signal GWRT[i] shifts between high level and low level as described above with reference to FIG. 4, and these shifts may unfavorably vary the voltage to be applied to the capacitance element C1 or the organic EL element 8. In addition, it can be considered that such a feed-through phenomenon has a more adverse effect as the time period required for the shifts of the scanning signal GWRT[i] or the width of the shifts thereof becomes smaller.

Accordingly, in the third embodiment in which the scanning signal GWRT[i] has a high possibility of being distorted massively, there is a higher possibility that the above-mentioned time for the shifts and the width of the shifts increase. Therefore, the possibility that the feed-through phenomenon will occur is extremely low.

As described above, according to the third embodiment, it is possible to reduce the danger of the variation of the potentials in the unit circuits P in accordance with the state shifts of the scanning signal GWRT[i] (that is, the danger of the occurrence of the feed-through phenomenon), to thereby display images with higher qualities.

Although description has been made of the embodiments of the invention as stated above, the electro-optical device according to the invention is not limited to the above mentioned embodiments, and various modifications can be made.

Figure 10:
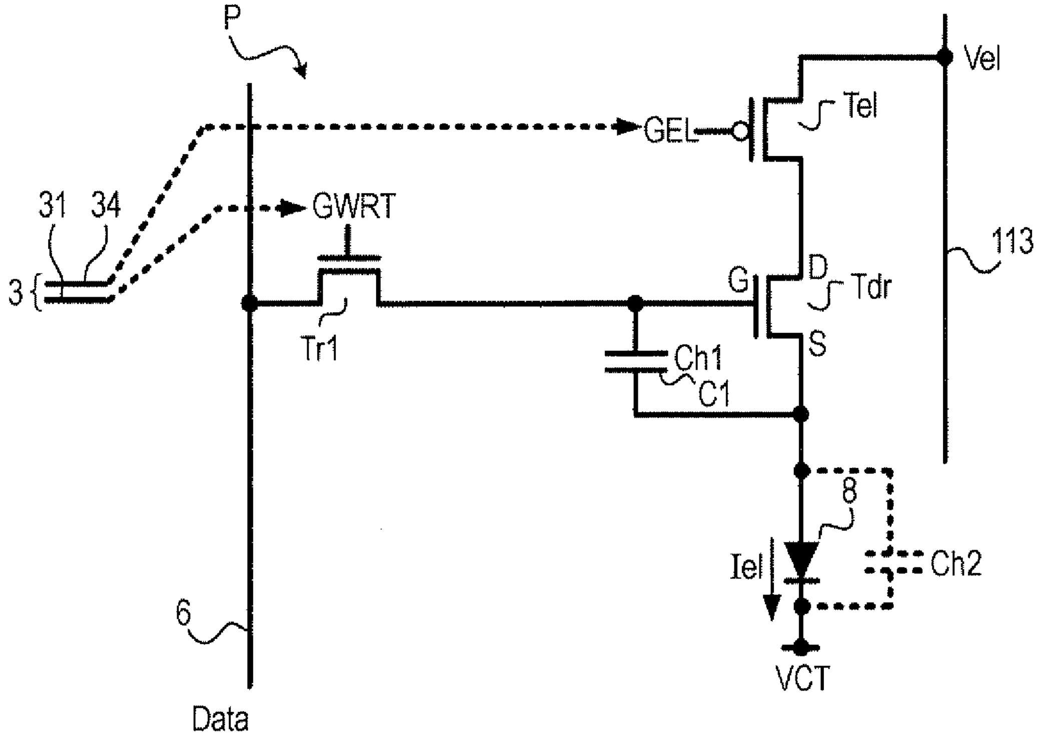
FIG. 10 is a circuit diagram illustrating a detail of a unit circuit according to another embodiment of the invention.

According to the embodiments of the invention, for example, the unit circuit P includes the second and third transistors Tr2 and Tr3 as shown in FIG. 2. However, the invention is not limited thereto. For example, a unit circuit with these transistors (Tr2 and Tr3) omitted therefrom may be used as shown in FIG. 10. In such a case, the operations, which are related to the second and third transistors Tr2 and Tr3 or to the first and second compensation control signals GINI1[*i*] and GINI2[*i*], among the above-mentioned operations (i) to (v) are not carried out. In addition, the compensation control line drive circuit 504A shown in FIG. 7 or the like is not required. However, it is still obvious that these configurations do not affect the essential part of the invention.

As described above, the invention can be widely applied to various configurations in addition to the configurations in the above embodiments or in the drawings.

Applications

Next, the electronic apparatuses to which the organic EL device 100 according to the above embodiments is applied will be described.

Figure 11:
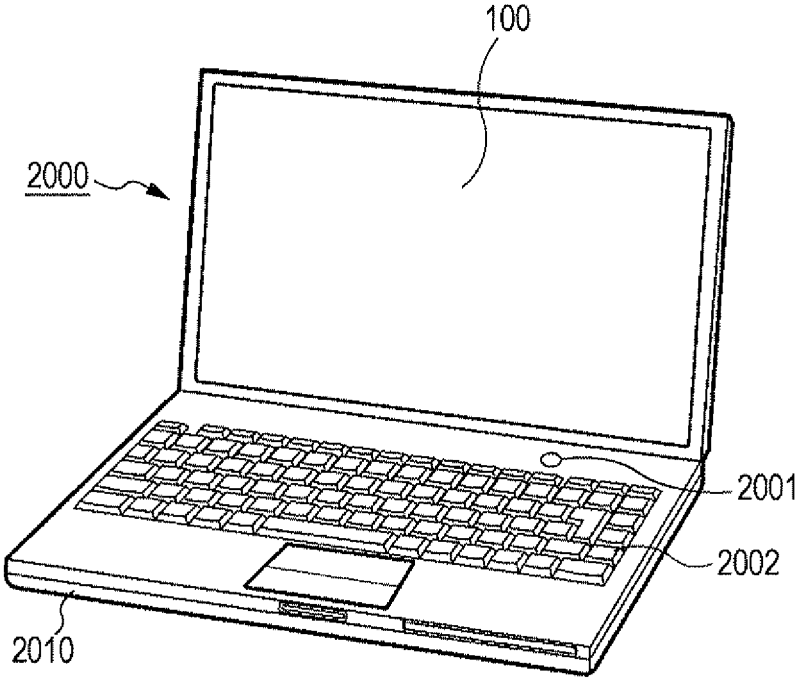
FIG. 11 is a perspective view illustrating an electronic apparatus to which an organic EL device according to the invention is applied.

FIG. 11 is a perspective view illustrating the configuration of a mobile personal computer to which the organic EL device 100 is applied as an image display device. The personal computer 2000 includes the organic EL device 100 as a display device and a main body 2010. The main body 2010 is provided with a power switch 2001 and a keyboard 2002.

Figure 12:
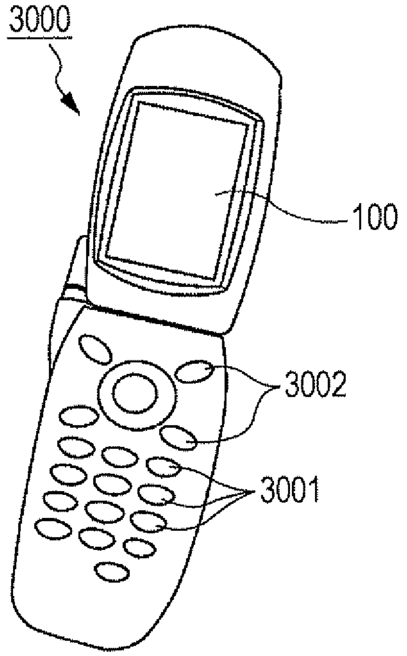
FIG. 12 is a perspective view illustrating another electronic apparatus to which an organic EL device according to the invention is applied.

FIG. 12 shows a mobile phone to which the organic EL device 100 according to the present embodiments is applied. The mobile phone 3000 includes a plurality of manipulation buttons 3001, scroll buttons 3002, and the organic EL device 100 as a display device. A screen displayed on the organic EL device 100 is scrolled by manipulating the scroll buttons 3002.

Figure 13:
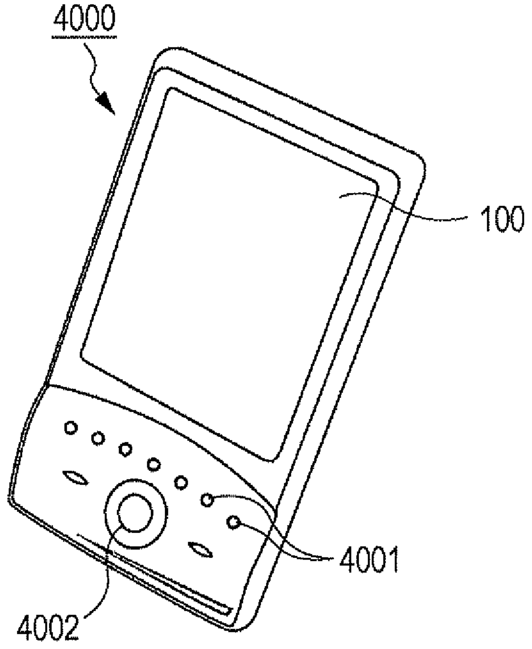
FIG. 13 is a perspective view illustrating still another electronic apparatus to which an organic EL device according to the invention is applied.

FIG. 13 shows a PDA (Personal Digital Assistant) to which the organic EL device 100 according to the present embodiments is applied. The PDA 4000 includes a plurality of manipulation buttons 4001, a power switch 4002, and the organic EL device 100 as a display device. Various pieces of information including an address list, a schedule planner, or the like are displayed on the organic EL device 100 by the manipulation of the power switch 4002.

Examples of the electronic apparatuses to which the organic EL device according to the invention can be applied include digital still cameras, televisions, video cameras, car navigation systems, pagers, electronic organizers, electronic papers, calculators, word processors, workstations, video phones, POS terminals, video players, and apparatuses with touch panels in addition to the examples shown in FIGS. 11 to 13.

What is claimed is:

1. An electro-optical device comprising:

a plurality of unit circuits provided correspondingly to intersections between a plurality of scanning lines and a plurality of data lines; and a scanning line drive circuit which supplies a control signal for controlling the unit circuits to each of the plurality of scanning lines, wherein each of the plurality of unit circuits includes:

a light emitting element which emits light with an intensity in accordance with a magnitude of a drive current;

a drive transistor which outputs the drive current when a data potential supplied via the data line is supplied to a gate thereof;

a light emitting control transistor which determines whether to flow the drive current through the drive transistor itself; and a switching element with one end connected to the gate of the drive transistor and the other end connected to the data line, wherein each of the plurality of scanning lines includes a light emitting control line which serves as a channel of a light emitting control signal, the light emitting control signal being the control signal which directs the gate of the light emitting control transistor arranged along an extending direction of the scanning line to shift the light emitting control transistor between a conductive state and a non-conductive state, wherein the scanning line drive circuit includes:

a first light emitting control line drive circuit connected to one end of the light emitting control line; and a second light emitting control line drive circuit connected to the other end of the light emitting control line, and wherein the first and second light emitting control line drive circuits supply the light emitting control signal for shifting the light emitting control transistor to the conductive state to the light emitting control line from both ends thereof at a timing at which a mobility compensation operation is carried out.

2. The electro-optical device according to claim 1, wherein each of the plurality of scanning lines includes, in addition to the light emitting control line, a writing control line which serves as a channel of a writing signal, the writing signal being the control signal which directs the switching element to shift between a conductive state and a non-conductive state, which determines whether to supply the data potential to the gate of the drive transistor, and wherein the first and second light emitting control line drive circuits supply the light emitting control signal to the light emitting control line from both ends thereof in the course of the supply of the writing signal which shifts the switching element to the conductive state to the writing control line.

3. An electronic apparatus comprising:

the electro-optical device according to claim 2.

4. An electronic apparatus comprising:

the electro-optical device according to claim 1.

5. An electro-optical device comprising:

a plurality of unit circuits provided correspondingly to intersections between a plurality of scanning lines and a plurality of data lines; and a scanning line drive circuit which supplies a control signal for controlling the unit circuits to each of the plurality of scanning lines, wherein each of the plurality of unit circuits includes:

a light emitting element which emits light with an intensity in accordance with a magnitude of a drive current;

a drive transistor which outputs the drive current when a data potential supplied via the data line is supplied to a gate thereof;

a light emitting control transistor which determines whether to flow the drive current through the drive transistor itself; and a switching element with one end connected to the gate of the drive transistor and the other end connected to the data line, wherein each of the plurality of scanning lines includes:

a light emitting control line which serves as a channel of a light emitting control signal, the light emitting control signal being the control signal which directs the gate of the light emitting control transistor arranged along an extending direction of the scanning line to shift the light emitting control transistor between a conductive state and a non-conductive state, and a writing control line which serves as a channel of a writing signal, the writing signal being the control signal which directs the switching element to shift between a conductive state and a non-conductive state, which determines whether to supply the data potential to the gate of the drive transistor, wherein the scanning line drive circuit includes:

a light emitting control line drive circuit which is connected to one end of the light emitting control line and outputs the light emitting control signal; and a writing control line drive circuit which is connected to one end of the writing control line and outputs the writing signal, wherein the light emitting control line drive circuit is disposed adjacent to an image display region where the plurality of unit circuits are arranged, and wherein the light emitting control line drive circuit is between the writing control line drive circuit and the image display region.

6. The electro-optical device according to claim 5, further comprising:

a power line as a supply source of the drive current, wherein the power line is not disposed between the light emitting control line drive circuit and the image display region.

7. The electro-optical device according to claim 6, wherein the power line is disposed between the light emitting control circuit and the writing control line drive circuit.

8. An electronic apparatus comprising:

the electro-optical device according to claim 7.

9. An electronic apparatus comprising:

the electro-optical device according to claim 6.

10. The electro-optical device according to claim 5, wherein the light emitting control line drive circuit includes a buffer which outputs the light emitting control signal, and wherein the light emitting control line drive circuit is disposed adjacent to the image display region such that the buffer is disposed adjacent to the image display region.

11. An electronic apparatus comprising:

the electro-optical device according to claim 10.

12. An electronic apparatus comprising:

the electro-optical device according to claim 5.

* * * * *